May 15, 1956  H. A. GEHRES  2,745,502
PROPELLER PITCH CONTROL MECHANISM
Filed Feb. 18, 1954  3 Sheets-Sheet 1

INVENTOR.
Hewitt A. Gehres
BY
Wood, Beal, Haselton,
Arene & McIlhannon
Attys

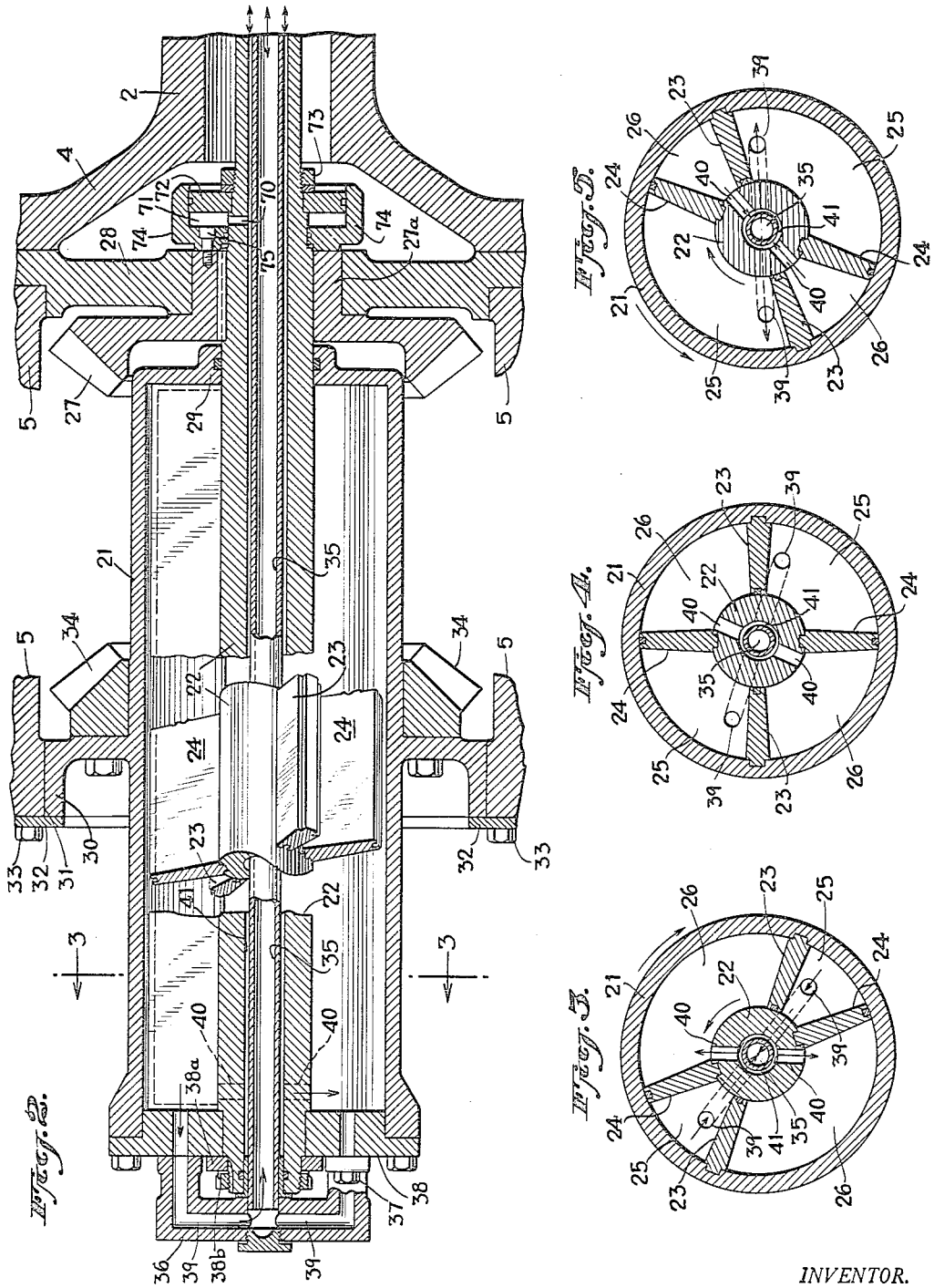

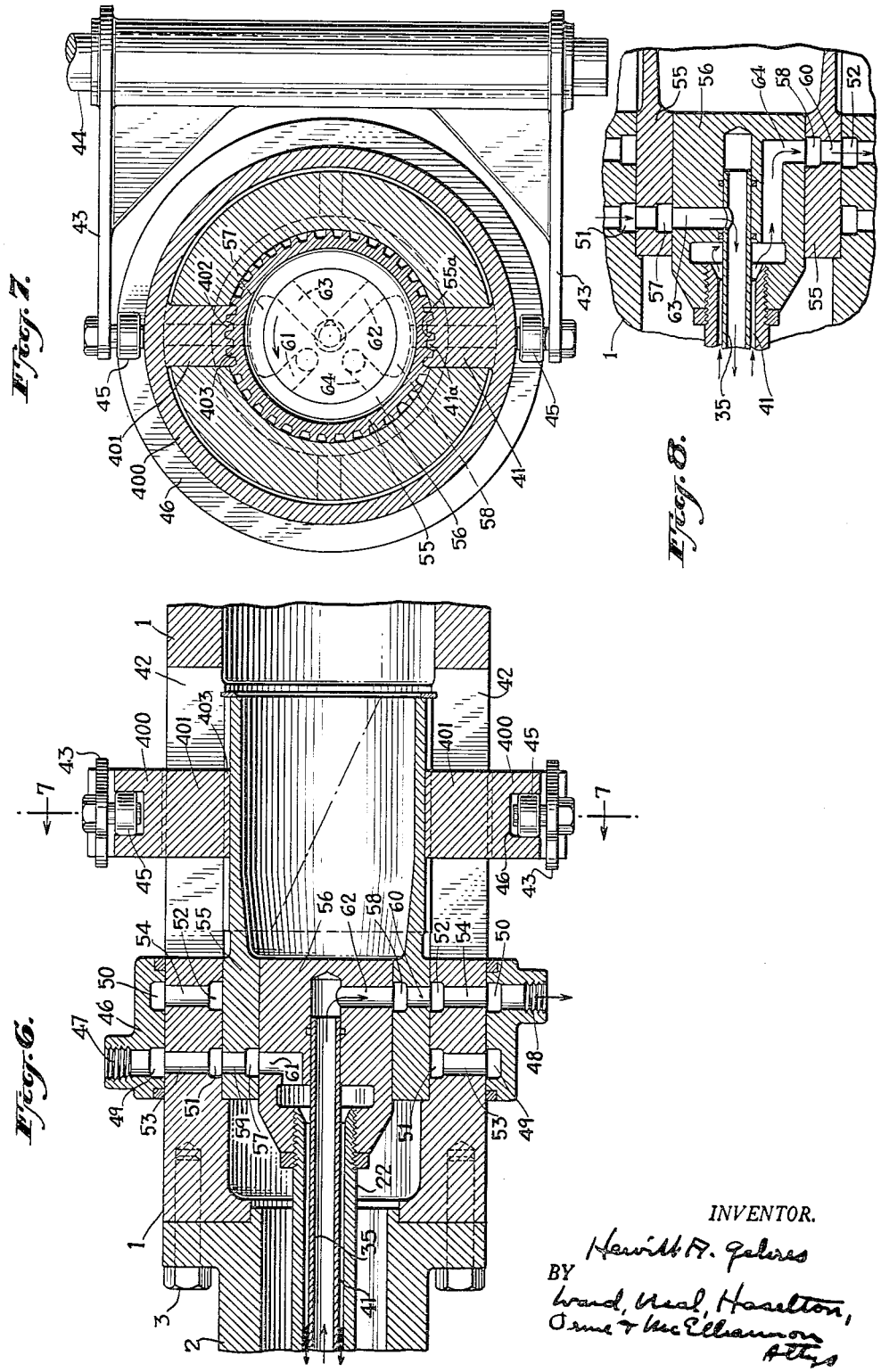

United States Patent Office 2,745,502
Patented May 15, 1956

2,745,502

PROPELLER PITCH CONTROL MECHANISM

Hewitt A. Gehres, Mount Vernon, Ohio, assignor to Cooper-Bessemer Corporation, Mount Vernon, Ohio, a corporation of Ohio Application February 18, 1954, Serial No. 411,176

4 Claims. (Cl. 170—160.32)

In the use of aquatic propellers, it is sometimes desired to provide adjustment of the pitch of the propeller blades, so that they may be "feathered" to produce no propulsion in either direction, or adjusted to produce forward or reverse thrusts in varying degree, the propeller thus serving as a reversing mechanism, and also to maintain better efficiency under different speeds, loadings, etc. by appropriate adjustments of the pitch of the propeller blades to suit operating conditions and requirements.

In one of its aspects, the invention relates particularly to a pitch controlling mechanism appropriate for the above purposes, which is powered by fluid under pressure, one important object of the invention being to provide such a mechanism wherein power adequate for satisfactory operation, may be obtained without requiring the use of excessively high fluid pressure in operation. In another aspect the invention aims to provide such a mechanism wherein the turning moment which adjusts the pitch of each blade, will be so applied as to be substantially balanced with regard to the axis about which the pitch of the blade is adjusted, thereby largely relieving the mechanism of unbalanced, friction producing forces and thrusts incident to adjustments of the pitch. Further objects and advantages of the invention will be in part obvious and in part specifically referred to in the description hereinafter contained, which, taken in conjunction with the accompanying drawings, discloses a preferred form of propeller pitch controlling mechanism constructed to operate in accordance with the invention; the disclosure however should be considered as only illustrative of the invention in its broader aspects.

In the drawings:

Fig. 2 is a detail longitudinal section taken through certain of the main operating parts of the mechanism shown in Fig. 1, and with such parts shown somewhat enlarged.

Figs. 3, 4 and 5 are sections taken on the line 3—3 of Fig. 1, but showing certain of the working parts of the mechanism in different operating relationships.

Fig. 6 is a longitudinal section, somewhat enlarged, of the parts of the mechanism which appear at the right of Fig. 1.

Fig. 7 is a section on line 7—7 of Fig. 6.

Fig. 8 is a view similar to the central portion of Fig. 6, by showing the parts in different operational relationship.

Figure 1:
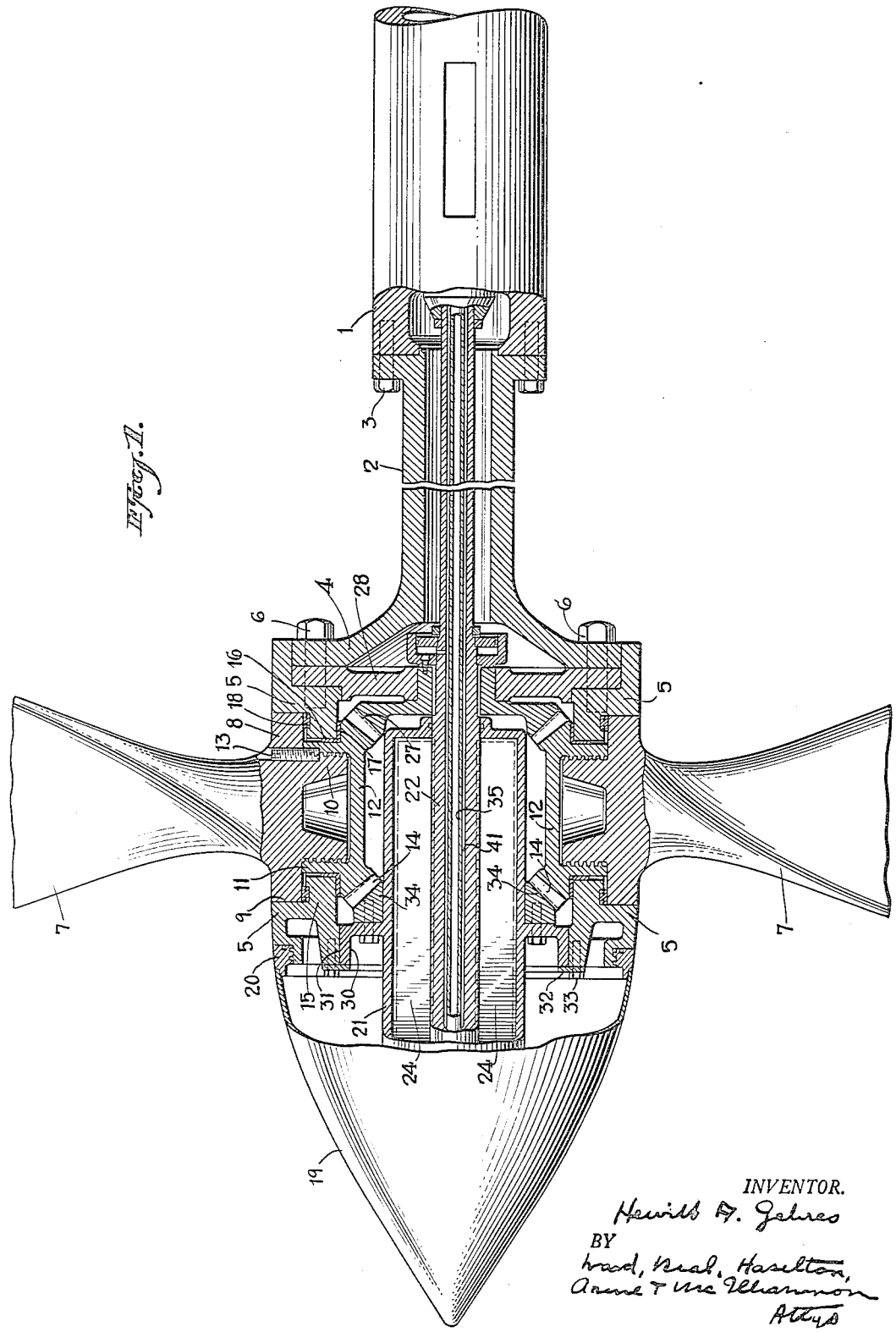
Fig. 1 is a central longitudinal sectional view of a propeller pitch controlling mechanism embodying the invention.

The invention is illustrated as applied to a rotary propeller shaft structure having hollow shaft sections 1 and 2 (Fig. 1) bolted together as indicated at 3, the hollow shaft section 2 having a circular flange 4 at its rearward end. A shell-like housing 5 for the pitch adjusting mechanism is clamped to the flange 4 by bolts 6 (Fig. 1), the housing 5 being thus carried by and rotating with the propeller shaft structure.

An appropriate number of propeller blades 7 are to be understood as spaced around the periphery of the housing 5 and so mounted that each propeller blade is angularly adjustable with respect to the housing, about an axis directed substantially radially with respect to the axis about which the housing and propeller shaft structure conjointly rotate. Since the pitch adjusting mechanism may be similarly related to all of the blades, a description thereof as applied to one blade will serve for all.

As shown in Fig. 1, the base flange 8 of a propeller blade may be received in a peripheral circular recess 9 in the housing 5, the blade being shown as having a threaded hub 10 which engages within a threaded collar 11 extending outwardly from the pitch adjusting member 12. The propeller blade 7 and its adjusting member 12 are thus detachably held together, and they may be locked against accidential loosening by a threaded pin 13 which penetrates into the joint between them.

The pitch adjusting member 12 is shown in the form of a bevel gear having teeth 14 (Fig. 1) located inwardly of a circular seat 15 in the housing 5, which acts as a bearing for the propeller blade and the gear 12 during adjustment of the pitch, liner rings for this bearing being provided as indicated at 16 and 17, and also a sealing ring as indicated at 18 to prevent water from entering into the interior of the housing through the joint at the bearing. A conical shell 19 carried by a threaded ring 20, may also be mounted at the outboard end of the housing 5 to enclose and seal off the space within the housing from surrounding water.

To supply power for adjusting the pitch of the blades, I provide a chamber or chambers within the housing 5, to and from which fluid under pressure is conducted. In the illustrated form of the invention, fluid under pressure is received in the annular space between a cylinder 21 located substantially centrally within the housing 5 and extending longitudinally of the propeller shaft structure, and a hollow shaft 22 running centrally through cylinder 21. Vane members 23 (Figs. 3–5) carried by the cylinder 21 and vane members 24 carried by the hollow shaft 22, are shown as partitioning the annular space between the cylinder 21 and the hollow shaft 22, so as to divide this space into a plurality of sub-chambers 25, 25, and 26, 26, as indicated in Figs. 3–5. The shaft 22 has splined to one end thereof as indicated in Fig. 2, a bevel gear member 27, which latter is journaled in a web 28 clamped between the flange 4 and housing 5. Thus the hollow shaft 22 and the gear 27 fixed thereto may move angularly with respect to the propeller shaft structure and housing 5, about the axis of rotation of the propeller shaft structure and the housing 5.

The cylinder 21 is likewise mounted so that it may move angularly about the last mentioned axis, with respect both to the housing 5 and the shaft 22. As shown in Fig. 2, a hub 29 mounts the forward end of the cylinder 21 for turning with respect to the shaft 22, and the cylinder 21 is also provided with a cylindrical flange 30 which is journaled within a seat 31 in the housing 5, so as to allow the cylinder 21 to move angularly within and with respect to the housing 5. A retaining ring 32 (Fig. 2), held in place by bolts 33, may be provided to hold the cylinder 21 rotatably in position, and a bevel gear 34 fixed to cylinder 21, engages the bevel gear 14 which is fixed to the propeller blade 7.

With the parts thus coordinated, if fluid such as oil under pressure be admitted for example to the chambers 26, 26, as the parts appear in Fig. 3, while the chambers 25, 25 are connected to exhaust ports, so that fluid may pass out of these chambers, the sets of vanes 23 and 24 will cause the cylinder 21 to move angularly in one direction, and the hollow shaft 22 to move angularly in the other direction, as indicated respectively by the arcuate arrows in Fig. 3. This angular movement of the members 21 and 22 with respect to each other and also with respect to the propeller shaft structure and the housing 5, will turn the gear members 27 and 34 in opposite directions, and since these gears engage the gear 12 at points spaced substantially diametrically with respect to the axis of gear 12, which is the axis about which the pitch of the propeller is adjusted, the pitch adjustment will be effected by the application of forces which produce a substantially balanced torque. The bearings of the propeller blades accordingly are relieved of high frictional forces which otherwise would be set up during adjustment.

In the form of the invention under discussion, fluid under pressure may be supplied to or withdrawn from the chambers 25, through a central tube 35 (Fig. 2) which passes through the hollow shaft 22, and is fastened at its rearward end to a fitting 36 (Fig. 2) clamped by bolts 37 to the adjacent end wall 38 of cylinder 21, the fitting 36 having passageways 39 which communicate respectively with the chambers 25. The rearward end of the shaft 22 is journaled in the wall 38, and a ring 38a (Fig. 2), held in position by a nut 38b, holds the shaft 22 against endwise movement with respect to wall 38.

The hollow shaft 22 is shown as provided with ducts 40 (Fig. 2) which respectively connect the chambers 26, 26 with an annular fluid passageway 41 located between the hollow shaft 22 and the tube 35. Thus if fluid under pressure is admitted through tube 35 to the chambers 25, while the chambers 26 are connected through ducts 40 to the passageway 41 through which operating fluid is being drawn off, the relative turning movements of the cylinder 21 and hollow shaft 22 will be as indicated by the arcuate arrows in Fig. 5. On the contrary, if fluid under pressure be admitted through the passageway 41 and ducts 40 to chambers 26, 26, while fluid is being drawn off from chambers 25 through passages 39 and tube 35, the relative turning movements of the cylinder 21 and hollow shaft 22 will be in the opposite direction as indicated by the arcuate arrows in Fig. 3. The direction of angular movement indicated in Fig. 3 may be that obtaining, for example, when the forward thrust of the propeller is to be increased, while the direction as indicated in Fig. 5 may be that obtaining when the pitch is to be adjusted to decrease the forward thrust of the propellers, or adjust the latter to produce a reverse thrust. The position of Fig. 4 may be understood to be that obtaining when the propellers are "feathered" so as to idle with little or no thrust in either direction during rotation of the propeller shaft structure.

A pitch adjusting mechanism of the above character makes it possible to apply the relatively large amount of power needed to adjust the pitch of the blades, without requiring excessively high hydraulic pressure in operation. Power available for pitch adjustment will depend upon the fluid pressure and the effective area of the vanes 23, 24 exposed to this pressure. While the vanes and associated elements are necessarily limited in respect to their extent radially of the propeller, the cylinder 21 and associated vanes may be readily extended longitudinally of the propeller shaft structure, as needed to increase their effective area. In actual practice, the hydraulic pressure needed to operate the mechanism may readily be kept down by longitudinally extending the parts as above mentioned, to about one quarter of the pressure which otherwise would be required.

It should be noted that the gear members 27 and 34 which transmit the relative angular movements of the vanes 23, 24 to the pitch adjusting gear 14, respectively engage the gear 14 at diametrically opposite points, i. e. at points located respectively forwardly and rearwardly of the axis of the propeller blade 7, about which axis the pitch of the blade is adjusted. During adjustment of the pitch, the gears 34 and 27 will move angularly in opposite directions to apply equal turning moments to gear 14, thereby applying pitch adjusting forces to the propeller blade which are substantially balanced about its axis of adjustment. In this way, the bearing surfaces at the base of the propeller blade are largely relieved of unbalanced friction producing stresses which otherwise would be set up during adjustment of the pitch.

In Figs. 6–8, I have shown one form of pilot valve apparatus which may be used to control the setting and operation of the pitch adjusting mechanism, this particular form of apparatus being referred to only by way of example. In Fig. 6, the propeller shaft section 1 is shown as having rotatably and slidably mounted thereon, a ring 400 provided with lugs 401 which project inwardly through diametrically opposed slots 42 (Fig. 6) in the hollow shaft section 1. In this form of apparatus, the pitch at which the adjusting mechanism sets the propeller blades, depends upon the position of the ring 400 longitudinally of the shaft section 1, and for the purpose of controlling and adjusting this longitudinal position, I have shown in Fig. 7 a lever member having arms 43 which are angularly adjustable about the axis of a shaft 44, and are provided with rollers 45 which engage in a peripheral groove 404 in ring 400. Thus this lever may be adjusted to move the ring 400 to and hold the ring in various positions longitudinally of shaft section 1.

The shaft section 1 is shown in Fig. 6 as enclosed by a stationary collar 46, to which a supply line for admitting oil under pressure may be connected at the fitting 47, and to which an offtake pipe for oil under pressure may be connected at the fitting 48. These fittings 47 and 48 communicate respectively with annular channels 49 and 50 in the inner surface of the collar 46, such channels in turn being respectively in communication with annular channels 51 and 52 in the inner surface of the shaft section 1, respectively through ducts 53 and 54.

A sleeve member 55 is mounted to move angularly within and with respect to the shaft section 1, a pilot valve member 56 being enclosed by the sleeve 55, and this pilot valve member being attached to the inner end of the shaft member 22 previously mentioned, so as to turn with the latter. The inner end of the tube 35 previously mentioned engages rotatably within the pilot valve member 56.

The inner surface of the sleeve member 55 is provided with arcuate channels 57 and 58 (Figs. 6 and 7) which are in communication respectively with the annular channels 51 and 52 through ducts 59 and 60 (Fig. 6). The angular position or setting of the sleeve 55 with respect to the shaft section 1 is determined by the setting of ring 400—longitudinally of the shaft section 1. As shown, the lugs 401 of ring 400 have spiral teeth 402 (Fig. 7) which engage with spiral teeth 403 on the outer surface of the sleeve 55, so as to twist the sleeve 55 more or less in one direction or the other with respect to the shaft section 1, as ring 400 is shifted in one direction or the other along the shaft section 1.

The pilot valve member 56 is shown as having a duct 61 which in the position shown in Fig. 6, affords communication from the fluid intake fitting 47 through the channels 49, 51 and 57, to the annular passageway 41 surrounding the central tube 35 previously referred to, thereby admitting fluid under pressure to the chambers 26 through the passages 40 as indicated in Fig. 3. In the same setting of the parts, as indicated in Fig. 6, a duct 62 in the pilot valve member 56 connects the interior of the tube 35 to the fluid offtake fitting 48, whereby fluid under pressure may flow out from the chambers 25 as indicated in Fig. 3. So long as the setting of the ring 400 remains the same, the above flow of operating fluid under pressure will continue until the shaft 22 and valve member 56 have twisted sufficiently with respect to the enclosing sleeve 55, to shut off the further flow of operating fluid through the pilot valve member 56. Fig. 7 shows such an angular setting of the parts, wherein the arcuate passage 57 no longer communicates with the duct 61 and the arcuate channel 58 no longer communicates with the duct 62.

Fig. 8 indicates a reverse setting of the sleeve 55 with respect to the shaft section 1 and pilot valve member 56, wherein the annular channel 51 through which incoming operating liquid flows, is connected through the arcuate channel 57 to a duct 63 (Fig. 8) in the pilot valve member 56, which duct communicates with the interior of the tube 35. Thereby operating fluid under pressure is admitted into tube 35 and into the chambers 25, 25 as indicated in Fig. 5. At the same time, a duct 64 (Fig. 8) in the pilot valve member 56 places the annular passageway 41 in communication with the arcuate channel 58 of sleeve 55, and thence through the duct 60 to the annular channel 52 in the shaft section 1, which latter is in communication with the offtake fitting 48 for fluid under pressure. The resulting adjustment of pitch of the propeller blades will continue until the pilot valve member 56 moves far enough angularly with respect to sleeve 55, to shut off the further flow of operating fluid as indicated in Fig. 7. In other words, once the pitch adjustment has been made, so long as the setting of the ring 400 remains the same, the parts of the pitch adjusting mechanism remain stationary with respect to each other; but whenever the longitudinal position of the ring 400 is altered in either direction, the pitch of the propeller blades is proportionately increased or decreased as determined by the new position to which the ring is shifted.

In operation, the gears 27 and 34 will be in driving relation to the pitch adjusting gears 14 of all of the propeller blades, such blades and their adjusting gears being spaced equally around the periphery of the housing 5, and the gears 27 and 34 serving to simultaneously adjust the pitch of each propeller blade in line manner. Preferably means is provided to urge the gears 27 and 34 toward the gears 12 interposed therebetween, to eliminate backlash or looseness of engagement between the gears. As shown in Fig. 2, fluid under pressure in the passageway 41 may enter through a duct 70 into chamber 71 which surrounds the shaft 22 and is interposed between a disc 72 clamped by a nut 73 to the shaft 22, and a cup-like member 74 clamped by screws 75 to the adjacent face of the hub 27a of gear 27. The fluid under pressure in the chamber 71 urges the members 72 and 74 apart, longitudinally of shaft 22. This pressure is transmitted through shaft 22, end wall 38 and cylinder 21 to urge the gear 34 to move to the right as the parts appear in Fig. 2, i. e., into tighter engagement with the pitch adjusting gears 12 which are located to the right thereof. And in like manner, the fluid pressure in chamber 71 is transmitted through cup member 74 and the hub 27a to urge the gear member 27 toward the left as the parts appear in Fig. 2, i. e., into tighter engagement with the adjacent teeth of the pitch adjusting gears 12. In other words, the pressure in chamber 71 urges the gear 27 to move rearwardly of the propeller shaft structure, and urges the gear 34 to move forwardly of the propeller shaft structure, thereby to hold the pitch adjusting gears more tightly in engagement with both of the gears 27 and 34.

While the invention has been disclosed as applied to a propeller pitch adjusting mechanism of the above described specific form, it should be understood that changes may be made therein without departing from the invention in its broader aspects, within the scope of the appended claims.

I claim:

1. Propeller pitch control mechanism of the character described, including a housing rotatable with the propeller shaft structure, a propeller blade adjusting member provided with means for connecting a propeller blade thereto and mounted to move angularly with respect to said housing about an axis directed substantially radially with respect to the axis of rotation of the housing, to thereby alter the pitch of the propeller, said mechanism having a chamber and means for supplying fluid under pressure to said chamber and withdrawing same therefrom, said chamber having vane members extending longitudinally with respect to the propeller shaft structure and mounted to afford relative angular movement between said vane members about an axis directed longitudinally with respect to the propeller shaft structure, in response to changes in fluid pressure in said chamber, one of said vane members being movable in a first direction and another of said vane members being movable in a second direction in response to fluid pressure in said chamber, and means coupling said one and said other of said vane members to said propeller adjusting member to move the latter angularly as aforesaid, in response to relative angular movement between said vane members as aforesaid.

2. Propeller pitch control mechanism of the character described, including a housing rotatable with the propeller shaft structure, a propeller blade adjusting member provided with means for connecting a propeller blade thereto and mounted to move angularly with respect to said housing about an axis directed substantially radially with respect to the axis of rotation of the housing, to thereby alter the pitch of the propeller, said mechanism having a chamber and means for supplying fluid under pressure to said chamber and withdrawing same therefrom, said chamber having vane members extending longitudinally with respect to the propeller shaft structure and mounted to afford relative angular movement between said vane members about an axis directed longitudinally with respect to the propeller shaft structure, in response to changes in fluid pressure in said chamber, and means respectively coupling said vane members to said propeller adjusting member at points spaced substantially symmetrically around the aforesaid radially extending axis to thereby apply pitch adjusting moments of force which are substantially balanced about said last mentioned axis.

3. Propeller pitch control mechanism of the character described, including a housing rotatable with the propeller shaft structure, a gear member provided with means for connecting a propeller blade thereto, said gear member being mounted to move angularly with respect to said housing about an axis directed substantially radially with respect to the axis of rotation of the housing to thereby alter the pitch of the propeller, said mechanism having a cylinder located substantially centrally within said housing and directed substantially longitudinally of the propeller shaft structure, vane members dividing the space within said cylinder into sub-chambers, means for selectively supplying fluid under pressure to and withdrawing the same from said sub-chambers, said vane members being mounted to afford relative angular movement between them about an axis substantially concentric with the propeller shaft structure, in response to changes in fluid pressure in said sub-chambers, a gear member in driven relation to one of said vane members and engaging said first mentioned gear member, a second gear member in driven relation to another of said vane members, said last mentioned gear member also engaging said first mentioned gear member, whereby the pitch of the propeller blade is adjusted by the conjoint turning moments exerted by both of the gear members so engaging said first mentioned gear member.

4. Propeller pitch control mechanism of the character described, including a housing rotatable with the propeller shaft structure, a gear member provided with means for connecting a propeller blade thereto and mounted to move angularly with respect to said housing about an axis directed substantially radially with respect to the axis of rotation of the housing to thereby alter the pitch of the propeller, a cylinder located substantially centrally within said housing, and in line with the propeller shaft structure, a shaft located substantially centrally within said cylinder, said cylinder and shaft respectively carrying vane members dividing the space within the cylinder into sub-chambers, means for selectively supplying fluid under pressure to and withdrawing the same from said sub-chambers, said cylinder and the shaft therein and the vane members respectively carried by said cylinder and shaft, being mounted to move angularly with respect to each other about the axis of said cylinder, in response to changes in fluid pressure in said sub-chambers, a gear member moving angularly with said cylinder and engaging said first mentioned gear member, a second gear member moving angularly with said shaft, said second gear member also engaging said first mentioned gear member, whereby the pitch of the propeller is altered by the conjoint turning moments exerted on said first mentioned gear member by the gear members engaging the same as above set forth.

References Cited in the file of this patent

UNITED STATES PATENTS

| | | |
|---|---|---|
| 1,892,187 | Drennon | Dec. 27, 1932 |
| 2,276,347 | Ruths et al. | Mar. 17, 1942 |
| 2,355,039 | Eves | Aug. 1, 1944 |
| 2,433,990 | Hardy | Jan. 6, 1948 |

FOREIGN PATENTS

| | | |
|---|---|---|
| 518,181 | Germany | Feb. 13, 1931 |
| 685,410 | Great Britain | Jan. 7, 1953 |